J. P. VINCENT & G. W. McKINNY.
UMBRELLA DRIP-CUP.
No. 7,276. Reissued Aug. 22, 1876.
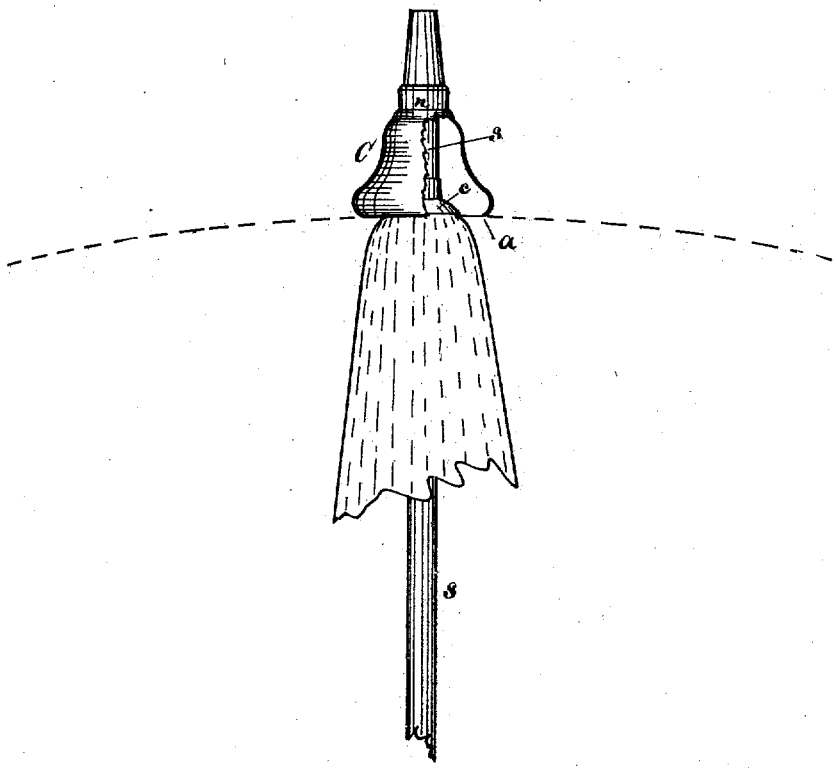
Witnesses.
G. J. Kingsbury
G. B. Selden.
Inventors
J. P. Vincent & G. W. McKinny
By Wm. S. Loughborough
Atty
N. PETERS, PHOTO-LITHOGRAPHER, WASHINGTON, D. C.

UNITED STATES PATENT OFFICE.

JOHN P. VINCENT AND GEORGE W. McKINNY, OF ROCHESTER, NEW YORK; SAID McKINNY ASSIGNOR, BY MESNE ASSIGNMENTS, TO P. B. VIELE.

IMPROVEMENT IN UMBRELLA DRIP-CUPS.

Specification forming part of Letters Patent No. 175,883, dated April 11, 1876; reissue No. 7,276, dated August 22, 1876; application filed August 7, 1876.

*To all whom it may concern:*

Be it known that we, JOHN P. VINCENT and GEORGE W. McKINNY, of Rochester, in the county of Monroe and State of New York, have invented a certain new and useful Drip Attachment for Umbrellas; and we do hereby declare that the following is a full, clear, and exact description thereof, reference being had to the accompanying drawing, making part of this specification, in which the figure is a sectional elevation of our invention as applied to the umbrella-top.

There are probably few persons who have not experienced the annoyance of entering a house, office, church, or other place or building with a wet and dripping umbrella, and, being unable to dispose of it so as to prevent its drippings from going upon the carpet or floor, without leaving it in some exposed place where it might be stolen.

The object of our invention is to provide every umbrella with a perfect remedy for these defects. It consists in the employment of a light ornamental cup to be applied to the upper end of the staff or tip, so as to catch the drip when the umbrella is folded and inverted.

We preferably use a cup, C, formed of rubber, gutta-percha, or other elastic or flexible material. The neck or section *n* should be made small enough to fit snugly upon the smallest staff *s*, and, being elastic, it can be stretched upon a larger one, and in either case close upon it, water-tight. A large-sized cup may be applied to an extremely small staff by turning the edge of the neck *n* in so as to be double when applied, and thereby be as thoroughly water-tight around the staff as when applied in its normal condition to a larger one. The cup portion may be made bell-shaped, or in any other desired form, and of different sizes. It is desirable to provide the open edge of the cup with a somewhat contracted lip, as shown at *a*. This form for the edge would prevent any "slopping" from the cup, except when it should be intentionally emptied. This would be done by inclining the staff *s* before raising or opening the umbrella for use while it is yet wet and dripping.

It will be seen that this drip-cup does not obstruct the adjustment or application of the case upon the umbrella, as it is about as pliable as the cloth covering itself. The case, however, should be as much longer than the umbrella-bows as the depth of the cup.

It might be desirable to form the cups of wood, *papier-maché*, or of thin metal. If the latter is employed, they might be plated with gold or other fine metal. If desired, the cup might be applied between the ordinary metallic cap *c* and the covering of the umbrella, in which case it would be made without a neck, and made full, so as to expand, and the upper edge secured at intervals to the bows, so as to close with the umbrella, in folds.

What we claim as our invention is—

1. A drip-cup, C, for umbrellas, composed entirely of rubber or equivalent elastic material, for the purposes set forth.

2. A drip-cup, C, for umbrellas, provided with a neck, *n*, composed of rubber or equivalent elastic material, whereby the cup may be applied to either a large or a small staff, and the joint between them rendered water-tight without additional appliances, substantially in the manner and for the purposes set forth.

3. A drip-cup, C, for umbrellas, having its upper edge provided with a contracted or curved lip, *a*, substantially as and for the purposes set forth.

In testimony whereof we have hereunto subscribed our names in presence of two witnesses.

JOHN P. VINCENT.
GEORGE W. McKINNY.

Witnesses:
WM. L. LOUGHBOROUGH,
A. L. MABBITT.